US012140115B2

(12) United States Patent
Iizuka et al.

(10) Patent No.: US 12,140,115 B2
(45) Date of Patent: Nov. 12, 2024

(54) ENGINE START ABNORMALITY DIAGNOSIS APPARATUS

(71) Applicant: SUBARU CORPORATION, Tokyo (JP)

(72) Inventors: Kei Iizuka, Tokyo (JP); Yasuhiro Oota, Tokyo (JP); Kyouhei Degura, Tokyo (JP); Noriyuki Matsuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/451,305

(22) Filed: Aug. 17, 2023

(65) Prior Publication Data

US 2024/0084773 A1 Mar. 14, 2024

(30) Foreign Application Priority Data

Sep. 14, 2022 (JP) ................................ 2022-146274

(51) Int. Cl.

| | |
|---|---|
| ***F02N 11/00*** | (2006.01) |
| ***F02N 11/10*** | (2006.01) |
| *F02B 75/18* | (2006.01) |

(52) U.S. Cl.

CPC .... *F02N 11/108* (2013.01); *F02B 2075/1808* (2013.01); *F02B 2075/1816* (2013.01); *F02N 2200/022* (2013.01)

(58) Field of Classification Search

CPC ......................... F02N 11/108; F02N 2200/022

See application file for complete search history.

(56) References Cited

U.S. PATENT DOCUMENTS

| | | | | |
|---|---|---|---|---|
| 2002/0088430 A1* | 7/2002 | Umemoto | F02P 9/005 | 123/335 |
| 2006/0243257 A1* | 11/2006 | Freund | F02N 19/04 | 123/550 |
| 2009/0309530 A1* | 12/2009 | Shin | F02N 11/0859 | 318/490 |

(Continued)

FOREIGN PATENT DOCUMENTS

| | | |
|---|---|---|
| JP | 2004-044407 A | 2/2004 |
| JP | 2004-308586 A | 11/2004 |
| JP | 2007-224832 A | 9/2007 |

*Primary Examiner* — Phutthiwat Wongwian

*Assistant Examiner* — Sherman D Manley

(74) *Attorney, Agent, or Firm* — Rimon P.C.

(57) ABSTRACT

An engine start abnormality diagnosis apparatus determines a cause of a long cranking abnormality in which, when an engine including cylinders is started, start of the engine is not completed even if a cranking period is equal to or greater than a predetermined time. The engine start abnormality diagnosis apparatus includes a rotation speed detector and an abnormality diagnosis processor. The rotation speed detector detects a rotation speed of a crankshaft of the engine when at least one of the cylinders is in a latter stage of a compression stroke. The abnormality diagnosis processor determines that the cause of the long cranking abnormality is an electric system abnormality when the rotation speed is less than a predetermined threshold, and determines that the cause of the long cranking abnormality is a combustion abnormality when the rotation speed is equal to or greater than the threshold.

4 Claims, 6 Drawing Sheets

(56) References Cited

U.S. PATENT DOCUMENTS

| | | | | |
|---|---|---|---|---|
| 2011/0295459 | A1* | 12/2011 | Shin | F02N 11/108<br>701/33.7 |
| 2012/0017618 | A1* | 1/2012 | Price | F02N 11/108<br>62/127 |
| 2013/0042833 | A1* | 2/2013 | Hartmann | F02N 11/087<br>123/179.25 |
| 2015/0316016 | A1* | 11/2015 | Nakashima | F02N 11/0818<br>701/103 |
| 2016/0377014 | A1* | 12/2016 | Books | F02N 11/10<br>123/179.14 |
| 2017/0211536 | A1* | 7/2017 | Ghoneim | F02N 11/108 |
| 2018/0058413 | A1* | 3/2018 | Jiang | F02N 11/108 |
| 2018/0080404 | A1* | 3/2018 | Nair | G01P 21/02 |
| 2018/0162214 | A1* | 6/2018 | Yoshida | B60K 6/485 |
| 2019/0106145 | A1* | 4/2019 | Khafagy | B60W 10/20 |

* cited by examiner

ENGINE START ABNORMALITY DIAGNOSIS APPARATUS

CROSS-REFERENCE TO RELATED APPLICATIONS

The present application claims priority from Japanese Patent Application No. 2022-146274 filed on Sep. 14, 2022, the entire contents of which are hereby incorporated by reference.

BACKGROUND

The disclosure relates to an engine start abnormality diagnosis apparatus that determines a cause of a long cranking abnormality when an engine is started.

For example, Japanese Unexamined Patent Application Publication (JP-A) No. 2007-224832 discloses a diagnosis apparatus that diagnoses start performance of an internal combustion engine including a generator, a battery, and a starter with low cost, and estimates a cause of startability deterioration. JP-A No. 2007-224832 discloses that the diagnosis apparatus includes a sensor input unit, a control unit, a switch signal unit, and a diagnosis unit. The sensor input unit processes a crank rotation speed and a battery voltage. The control unit controls a start state of the internal combustion engine. The switch signal unit processes a key switch signal. The diagnosis unit performs an electric system diagnosis based on outputs of the sensor input unit, the control unit, and the switch signal unit, and diagnoses the start performance or the startability of the internal combustion engine based on a correlation between an output signal from the sensor input unit and an output signal from the control unit.

JP-A No. 2004-308586 discloses an abnormality cause determination method, to allow for an appropriate remedy when a sluggish rotation abnormality occurs upon starting a diesel engine. JP-A No. 2004-308586 discloses that the abnormality cause determination method includes a determination step of, upon occurrence of the sluggish rotation abnormality, determining whether a cause of the sluggish rotation abnormality is combustion deterioration or is an inappropriate combustion timing. JP-A No. 2004-308586 discloses, in one example, distinguishing between combustion deterioration such as a misfire and combustion at an inappropriate combustion timing, based on a difference ΔNE2 between a current engine speed $NE_n$ and a bottom value $NE_n'$ immediately before the start of combustion in the next combustion cylinder.

JP-A No. 2004-044407 discloses a control apparatus that identifies, as a malfunction, an engine stall or an engine start failure in which a malfunction of a system or a part is not identifiable. JP-A No. 2004-044407 discloses that the control apparatus is configured to output and save different malfunction codes for respective vehicle-mounted parts. JP-A No. 2004-044407 discloses, in the control apparatus, measuring a starting speed and an elapsed time from starter-on when the engine is started, comparing the measured value with a preset value, and saving starting data, assuming a starting malfunction including an engine stall or an engine start failure, when a set condition is satisfied.

SUMMARY

An aspect of the disclosure provides an engine start abnormality diagnosis apparatus configured to determine a cause of a long cranking abnormality in which, when an engine including cylinders is started, start of the engine is not completed even if a cranking period is equal to or greater than a predetermined time. The engine start abnormality diagnosis apparatus includes a rotation speed detector and an abnormality diagnosis processor. The rotation speed detector is configured to detect a rotation speed of a crankshaft of the engine when at least one of the cylinders is in a latter stage of a compression stroke. The abnormality diagnosis processor is configured to determine that the cause of the long cranking abnormality is an electric system abnormality when the rotation speed detected by the rotation speed detector is less than a predetermined threshold, and determine that the cause of the long cranking abnormality is a combustion abnormality when the rotation speed is equal to or greater than the threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
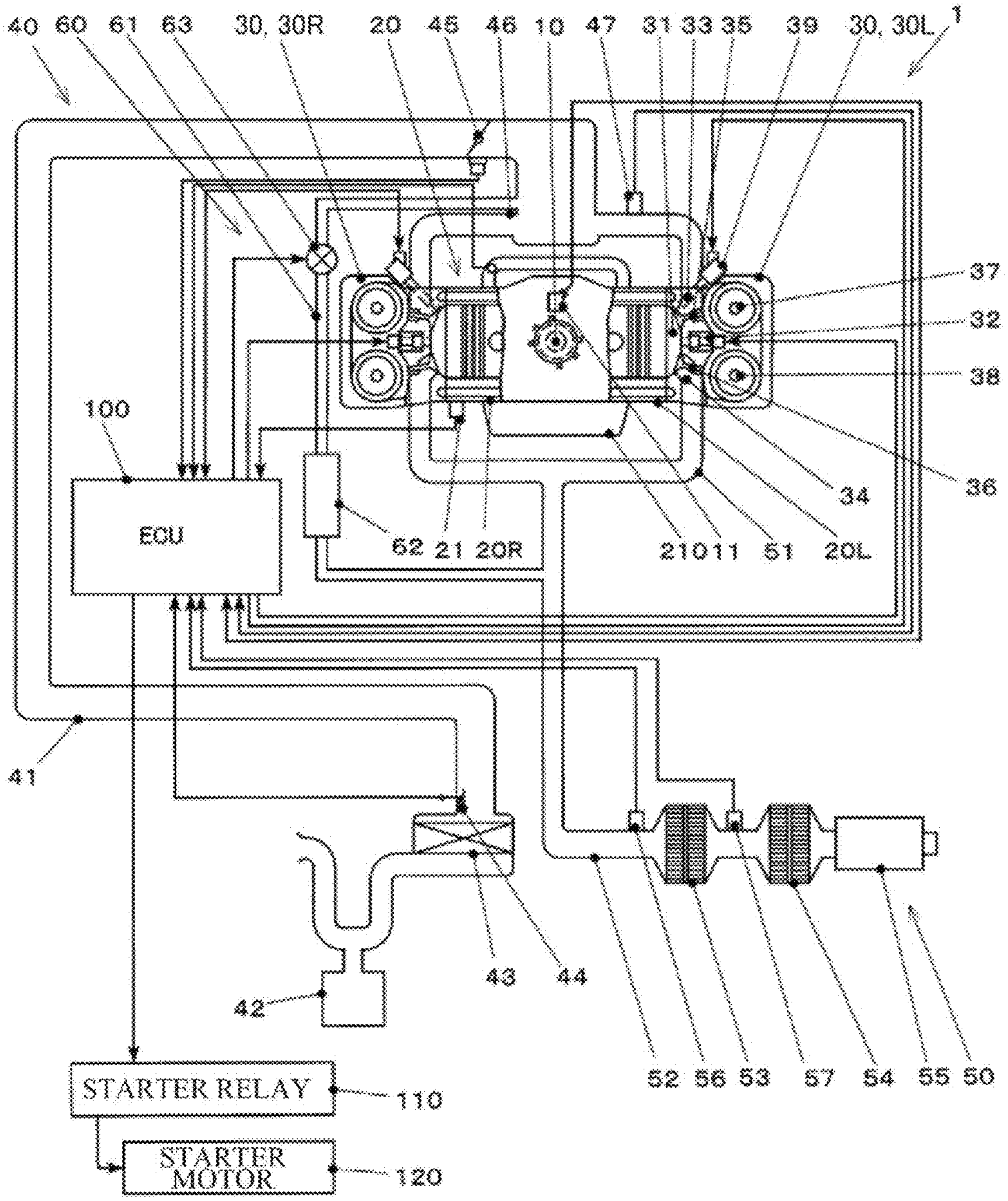
FIG. 1 is a diagram schematically illustrating a configuration of an engine provided with an engine start abnormality diagnosis apparatus according to one example embodiment of the disclosure.

When an engine is started, a long cranking abnormality can occur due to a variety of causes. The long cranking abnormality is an abnormality in which driving or cranking of a crankshaft by a starter motor takes an abnormally long time as compared with a normal case.

Upon occurrence of such a long cranking abnormality, when a mechanic carries out trouble shooting at a service location, for example, the mechanic narrows down causes one by one in accordance with a check list prepared in advance. It thus takes a long time for identification of the cause and repair.

It is desirable to provide an engine start abnormality diagnosis apparatus that makes it possible to easily narrow down causes of a long cranking abnormality when an engine is started.

According to an aspect of the disclosure, an engine start abnormality diagnosis apparatus is provided. The engine start abnormality diagnosis apparatus is configured to determine a cause of a long cranking abnormality in which, when an engine including cylinders is started, start of the engine is not completed even if a cranking period is equal to or greater than a predetermined time. The engine start abnormality diagnosis apparatus includes and a rotation speed detector an abnormality diagnosis processor. The rotation speed detector is configured to detect a rotation speed of a crankshaft of the engine when at least one of the cylinders is in a latter stage of a compression stroke. The abnormality diagnosis processor is configured to determine that the cause of the long cranking abnormality is an electric system abnormality when the rotation speed detected by the rotation speed detector is less than a predetermined threshold, and determine that the cause of the long cranking abnormality is a combustion abnormality when the rotation speed is equal to or greater than the threshold.

When the long cranking abnormality is caused by the combustion abnormality, the rotation speed of the crankshaft desired for normal start is obtained by a starter motor, but exhibits transition in which the rotation speed does not normally increase thereafter.

When the long cranking abnormality is caused by, for example, the electric system abnormality such as a failure of a body of the starter motor or a power source or wiring that supplies electric power to the starter motor, the rotation speed of the crankshaft desired for normal start is not obtained by the starter motor.

Such a difference in crankshaft rotation speed between a case of the combustion abnormality and a case of the electric system abnormality is significant in the latter stage of the compression stroke of at least one of the cylinders in which torque desired for the starter motor to rotate and drive the crankshaft becomes maximum.

According to the aspect of the disclosure, by using the phenomenon described above, the rotation speed of the crankshaft when at least one of the cylinders is in the latter stage of the compression stroke is compared with the threshold. This makes it possible to easily and quickly determine whether the cause of the long cranking abnormality is the combustion abnormality or is the electric system abnormality.

Note that the latter stage of the compression stroke may refer to a range including an extracted portion of a range of angular positions or crank angles of the crankshaft during the compression stroke, the extracted crank angles having a median at a position later than 90 degrees before a compression top dead center. For example, a range from 90 degrees before the compression top dead center to the compression top dead center may be extracted as the latter stage of the compression stroke. The start and the end of the range may be changed as appropriate within the scope of the above definition.

In an aspect of the disclosure, the engine may include a four-cylinder or two-cylinder engine configured to perform regular-interval ignition.

Thus, it is easier to extract the rotation speed of the crankshaft in a region where a starter motor driving load during cranking becomes heavy due to an action of, for example, an in-cylinder pressure of each cylinder or a valve spring reaction force of a valve driving system. This makes it possible to appropriately achieve the effect described above.

In an aspect of the disclosure, the threshold may be set lower than the rotation speed of the crankshaft when at least one of the cylinders is in the latter stage of the compression stroke during cranking performed when the starter motor is normal.

Thus, the rotation speed of the crankshaft exceeds the threshold when the cranking by the starter motor is normal, which makes it possible to accurately distinguish between the electric system abnormality and the combustion abnormality.

As described above, according to an embodiment of the disclosure, it is possible to provide an engine start abnormality diagnosis apparatus that makes it possible to easily narrow down causes of a long cranking abnormality when an engine is started.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In the following, a description is given of an engine start abnormality diagnosis apparatus according to an example embodiment of the disclosure.

The engine start abnormality diagnosis apparatus according to the example embodiment may be provided in, for example, a four-stroke internal combustion engine mounted as a traveling power source on a vehicle, for example, an automobile such as a passenger car.

FIG. 1 is a diagram schematically illustrating a configuration of an engine provided with the engine start abnormality diagnosis apparatus according to the example embodiment.

An engine 1 may be, for example, a horizontally opposed four-cylinder direct injection gasoline naturally aspirated engine.

The engine 1 may include a crankshaft 10, cylinder blocks 20, cylinder heads 30, an intake system 40, an exhaust system 50, an exhaust gas recirculation (EGR) device 60, and an engine control unit (ECU) 100, for example. The cylinder blocks 20 may include a cylinder block 20R and a cylinder block 20L. The cylinder heads 30 may include a cylinder head 30R and a cylinder head 30L.

The crankshaft 10 may be a rotating shaft serving as an output shaft of the engine 1.

To one end of the crankshaft 10 may be coupled an unillustrated power transmission mechanism such as a transmission.

The crankshaft 10 may be provided with crank pins arranged in an eccentric manner from the rotating shaft.

To the crank pins may be coupled respective pistons via unillustrated connecting rods.

An end of the crankshaft 10 may be provided with a crank angle sensor 11. The crank angle sensor 11 may detect an angular position of the crankshaft. In one embodiment, the crank angle sensor 11 may serve as a "rotation speed detector".

An output of the crank angle sensor 11 may be transmitted to the engine control unit 100.

The engine control unit 100 may calculate an engine speed or a crankshaft rotation speed based on the output of the crank angle sensor 11, independently for each of regions at rotation angular positions of the crankshaft 10.

With a two-divided configuration, the cylinder blocks 20 may include the cylinder block 20R on a right side and the cylinder block 20L on a left side. The cylinder blocks 20 may pinch the crankshaft 10 in left and right directions when the engine is longitudinally mounted on a vehicle body.

The cylinder blocks 20 may form a middle portion serving as a crank case.

The crank case may be a space used to accommodate the crankshaft 10.

The crank case may be provided with main bearings that rotatably support journals of the crankshaft 10.

The cylinder block 20R and the cylinder block 20L may be respectively disposed on the right side and the left side to pinch the crank case. The cylinder block 20R on the right side and the cylinder block 20L on the left side may each be provided with two cylinders in a case of a four-cylinder engine, for example. Inside the cylinders, the pistons being inserted may move back and forth.

The cylinder block 20 may be provided with a knock sensor 21.

The knock sensor 21 may include a piezoelectric device that generates an output voltage corresponding to vibration of the cylinder block 20.

The engine control unit 100 may be able to detect whether knocking has occurred, based on an output waveform of the knock sensor 21 peculiar to when knocking occurs.

The cylinder heads 30, i.e., the cylinder head 30R on the right side and the cylinder head 30L on the left side, may be provided at respective ends of the cylinder blocks 20 opposite to ends provided with the crankshaft 10. In other words, the cylinder head 30R and the cylinder head 30L may be respectively provided at the ends on the right side and the left side.

The cylinder heads 30 may include combustion chambers 31, ignition plugs 32, intake ports 33, exhaust ports 34, intake valves 35, exhaust valves 36, intake camshafts 37, exhaust camshafts 38, and injectors 39, for example.

For example, the combustion chambers 31 may be recessed and formed into a pent roof shape at portions of the cylinder heads 30. The portions may be opposed to crest surfaces of the pistons.

The ignition plugs 32 may generate a spark in accordance with ignition signals from the engine control unit 100 to ignite air-fuel mixture.

The ignition plugs 32 may be provided at middle portions of the combustion chambers 31.

The intake ports 33 may be channels that introduce air for combustion or fresh air into the combustion chambers 31.

The exhaust ports 34 may be channels that discharge burnt gas or exhaust gas from the combustion chambers 31.

The intake valves 35 and the exhaust valves 36 may open and close the intake ports 33 and the exhaust ports 34 at predetermined valve timings.

Two of the intake valves 35 and two of the exhaust valves 36 may be provided in each of the cylinders, for example.

The intake valves 35 and the exhaust valves 36 may respectively be opened and closed by the intake camshafts 37 and the exhaust camshafts 38 that rotate in synchronization at a speed of ½ of a rotation speed of the crankshaft 10.

Cam sprockets of the intake camshafts 37 and the exhaust camshafts 38 may be provided with unillustrated valve timing variable mechanisms. The valve timing variable mechanisms may advance and retard phase angles of the camshafts to change valve opening timings and valve closing timings for the valves.

The injectors 39 may inject fuel into the combustion chambers 31 in accordance with valve opening signals provided by the engine control unit 100 to generate air-fuel mixture.

The injectors 39 may have nozzles at respective tips. The fuel may be injected from the nozzles. The nozzles may be exposed, into the cylinders, from regions adjacent to the intake ports 33 of inner surfaces of the combustion chambers 31.

The intake system 40 may introduce air into the intake ports 33.

The intake system 40 may include an intake duct 41, a chamber 42, an air cleaner 43, an air flow meter 44, a throttle valve 45, an intake manifold 46, and an intake air pressure sensor 47, for example.

The intake duct 41 may be a channel that introduces external air into the intake ports 33.

The chamber 42 may be a space provided adjacent to and in communication with an inlet of the intake duct 41.

The air cleaner 43 may filter air to remove dust, for example.

The air cleaner 43 may be provided downstream of a portion at which the intake duct 41 and the chamber 42 are in communication with each other.

The air flow meter 44 may measure a flow rate of air passing through the intake duct 41.

The air flow meter 44 may be provided adjacent to an outlet of the air cleaner 43.

An output of the air flow meter 44 may be transmitted to the engine control unit 100.

The throttle valve 45 may be a butterfly valve that adjusts an air flow rate to control an output of the engine 1.

The throttle valve 45 may be provided in the intake duct 41 at a position around which the intake duct 41 and the intake manifold 46 are coupled to each other.

The throttle valve 45 may be driven to open and close by an unillustrated electric throttle actuator in accordance with a target throttle position. The target throttle position may be set by the engine control unit 100 in accordance with driver's requested torque, for example. The driver's requested torque may be torque requested by a driver who drives the vehicle.

The throttle valve 45 may be provided with a throttle sensor that detects a position of the throttle valve 45. An output of the throttle sensor may be transmitted to the engine control unit 100.

The intake manifold 46 may be a branched pipe that delivers air to the intake ports 33 of the cylinders.

The intake manifold 46 may be provided downstream of the throttle valve 45.

The intake air pressure sensor 47 may detect pressure of air in the intake manifold 46, i.e., may detect an intake air pressure.

An output of the intake air pressure sensor 47 may be transmitted to the engine control unit 100.

The exhaust system 50 may allow exhaust gas to exit from the exhaust ports 34 to outside.

The exhaust system 50 may include an exhaust manifold 51, an exhaust pipe 52, a front catalyst 53, a rear catalyst 54, a silencer 55, an air-fuel ratio sensor 56, and a rear $O_2$ sensor 57, for example.

The exhaust manifold 51 may be a collecting pipe that collects exhaust gas discharged from the exhaust ports 34 of the cylinders.

The exhaust pipe 52 may be a pipe channel that allows exhaust gas to exit from the exhaust manifold 51 to outside.

The front catalyst 53 and the rear catalyst 54 may be provided at an intermediate portion of the exhaust pipe 52. The front catalyst 53 and the rear catalyst 54 may include respective three-way catalysts that clean up HC, NOx, and CO, for example, in exhaust gas.

The front catalyst 53 may be provided adjacent to an outlet of the exhaust manifold 51. The rear catalyst 54 may be provided behind an outlet of the front catalyst 53.

The silencer 55 may decrease acoustic energy in exhaust gas.

The silencer 55 may be provided adjacent to an outlet of the exhaust pipe 52.

The air-fuel ratio sensor 56 may be provided between the outlet of the exhaust manifold 51 and an inlet of the front catalyst 53.

The rear $O_2$ sensor 57 may be provided between the outlet of the front catalyst 53 and an inlet of the rear catalyst 54.

The air-fuel ratio sensor 56 and the rear $O_2$ sensor 57 may each generate an output voltage corresponding to a concentration of oxygen in exhaust gas, to thereby detect an amount of oxygen in the exhaust gas.

The air-fuel ratio sensor 56 may be a linear output sensor that is able to detect a concentration of oxygen in exhaust gas at air-fuel ratios within a range. The range may be wider than a range of air-fuel ratios of exhaust gas from which the rear $O_2$ sensor 57 may detect a concentration of oxygen.

Outputs of the air-fuel ratio sensor 56 and the rear $O_2$ sensor 57 may both be transmitted to the engine control unit 100.

The EGR device 60 may extract, as EGR gas, some of exhaust gas from the exhaust manifold 51 to allow the some of the exhaust gas to recirculate into the intake manifold 46.

The EGR device 60 may include an EGR channel 61, an EGR cooler 62, and an EGR valve 63, for example.

The EGR channel 61 may be a pipe channel that introduces exhaust gas or EGR gas from the exhaust manifold 51 into the intake manifold 46.

The EGR cooler 62 may allow EGR gas flowing through the EGR channel 61 to exchange heat with the cooling water in the engine 1 to cool the EGR gas.

The EGR cooler 62 may be provided at an intermediate portion of the EGR channel 61.

The EGR valve 63 may be a flow regulating valve that adjusts a flow rate of EGR gas passing through the EGR channel 61.

The EGR valve 63 may be provided downstream of the EGR cooler 62 in the EGR channel 61.

The EGR valve 63 may have a valve body that is driven to open and close by an electric actuator such as a solenoid. By using a valve position map, a position of the EGR valve 63 may be controlled by the engine control unit 100. The valve position map may be set based on a predetermined target EGR rate. The target EGR rate may be a flow rate of EGR gas/flow rate of intake air, for example.

The engine control unit (ECU) 100 may comprehensively control the engine 1 and its auxiliary equipment.

The engine control unit 100 may include an information processor such as a central processing unit (CPU), a storage such as a random access memory (RAM) or a read only memory (ROM), an input-output interface, and a bus that couples the information processor, the storages, and the input-output interface, for example.

In addition, the engine control unit 100 may be provided with an unillustrated accelerator pedal sensor. The accelerator pedal sensor may detect how much the driver has depressed an unillustrated accelerator pedal.

The engine control unit 100 may be configured to set the driver's requested torque based on an output of the accelerator pedal sensor, for example.

The engine control unit 100 may control a throttle valve position, a boost pressure, a fuel injection amount, a fuel injection timing, an ignition timing, and a valve timing, for example, to allow the engine 1 to actually generate torque satisfying the set driver's requested torque.

The engine control unit 100 may control start of the engine 1 by, for example, switching on or off a starter motor 120 via a starter relay 110.

The starter motor 120 may be an electric motor that rotates and drives the crankshaft 10 when starting the engine 1.

The starter relay 110 may be a relay that switches a state of electric power supply from an unillustrated power source such as a battery to the starter motor 120.

The starter relay 110 may switch on or off electric power supply to the starter motor 120, in response to a command from the engine control unit 100.

When a request is made to start the engine 1, the engine control unit 100 may cause the starter motor 120 to rotate and drive the crankshaft 10, and cause ignition and fuel injection to be started.

Thereafter, when the rotation speed of the crankshaft 10 detected by the crank angle sensor 11 exceeds a predetermined start completion determination value (a complete explosion determination value), the engine control unit 100 may stop driving of the starter motor 120, assuming that the start of the engine 1 has been completed.

Further, the engine control unit 100 determines, upon occurrence of a long cranking abnormality, whether a cause of the long cranking abnormality is a combustion abnormality or is an electric system abnormality. In one embodiment, the engine control unit 100 may serve as an "abnormality diagnosis processor". The long cranking abnormality may be an abnormality in which the start of the engine 1 is not completed even though the starter motor 120 is driven for a cranking period of a predetermined time or more.

The electric system abnormality may be a state in which torque desired for the start is unable to be generated by the starter motor 120.

The combustion abnormality may be a state in which cranking by the starter motor 120 is normal, but a combustion state desired to increase the engine speed for the start is unable to be maintained by combustion.

This is described in detail below.

In the example embodiment, the engine 1 may include first to fourth cylinders arranged from a front end side of the crankshaft 10. The engine 1 may perform regular-interval ignition or regular-interval combustion for each crank angle (CA) of 180 degrees, in the order of the first cylinder, the third cylinder, the second cylinder, and the fourth cylinder.

Figure 2:
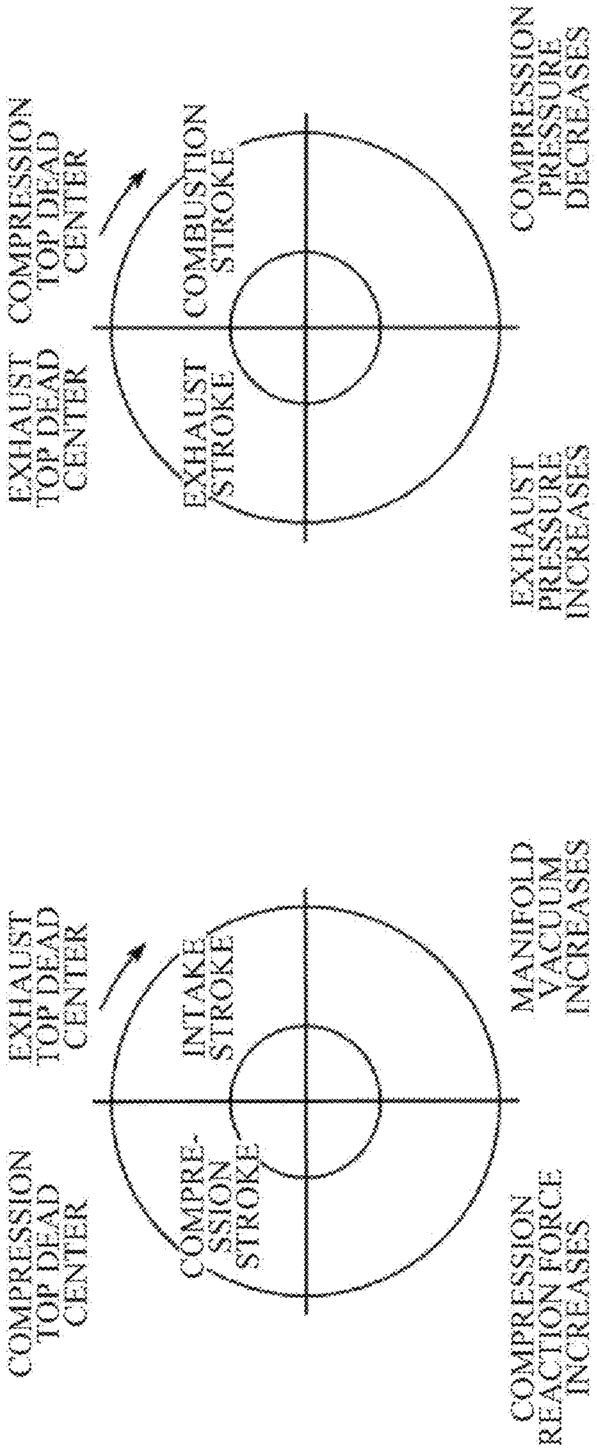
FIG. 2 is a diagram illustrating transition of strokes of a four-stroke engine.

FIG. 2 is a diagram illustrating transition of strokes of a four-stroke engine.

The left side of FIG. 2 illustrates transition from a top dead center at the end of an exhaust stroke (i.e., an exhaust top dead center), through an intake stroke and a compression stroke, to a top dead center at the end of the compression stroke (i.e., a compression top dead center).

The right side of FIG. 2 illustrates transition from the compression top dead center, through a combustion stroke and the exhaust stroke, to the exhaust top dead center.

In the engine 1 in the example embodiment, the intake stroke, the compression stroke, the combustion stroke, and the exhaust stroke may be performed in concurrence in the respective cylinders, because the engine 1 performs regular-interval ignition for each crank angle of 180 degrees.

For example, the compression stroke in the first cylinder may be performed simultaneously with the exhaust stroke in the second cylinder, the intake stroke in the third cylinder, and the combustion stroke in the fourth cylinder.

Focusing on any one cylinder, during the intake stroke, a manifold vacuum increases with rotation of the crankshaft 10, and torque desired for cranking tends to increase.

During the compression stroke, as a compression reaction force in the cylinder increases, torque desired for cranking tends to increase with rotation of the crankshaft 10.

During the combustion stroke illustrated in the right side of FIG. 2, a compression pressure decreases, and torque desired for cranking thus tends to decrease. Note that, during the combustion stroke, it is likely that the engine is actually not started yet and combustion is not performed.

During the exhaust stroke, an exhaust pressure when exhausting in-cylinder gas increases, and torque desired for cranking thus tends to increase.

A more detailed description is given of state transition during the compression stroke.

Figure 3:
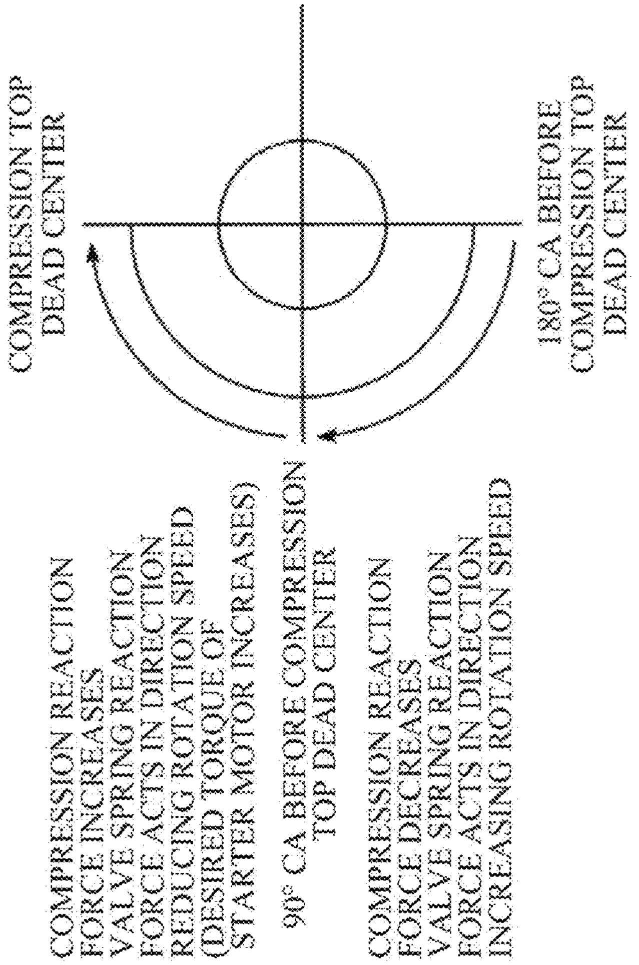
FIG. 3 is a diagram illustrating state transition during a compression stroke of the four-stroke engine.

FIG. 3 is a diagram illustrating state transition during the compression stroke of the four-stroke engine.

The compression stroke may be a period from 180-degree CA before the compression top dead center to the compression top dead center.

In a first half of the compression stroke, the compression reaction force is relatively low, and reaction forces of valve springs of other cylinders act in a direction applying a rotative driving force to the crankshaft 10. The first half of the compression stroke may be, for example, from 180-degree CA before the compression top dead center to 90-degree CA before the compression top dead center.

In contrast, in a latter half of the compression stroke, the compression reaction force becomes relatively high as compared with the first half, and the reaction forces of the valve springs of the other cylinders act in a direction applying resistance to rotation of the crankshaft 10. The latter half of the compression stroke may be, for example, from 90-degree CA before the compression top dead center to the compression top dead center.

As a result, torque of the starter motor 120 desired for cranking of the crankshaft 10 becomes maximum when any one cylinder is in the latter half of the compression stroke.

Therefore, for example, when there is an abnormality (the electric system abnormality) in a body of the starter motor 120, wiring including the starter relay 110, or the power source such as a battery, the rotation speed of the crankshaft 10 decreases significantly as compared with a normal case, due to a decrease in the torque of the starter motor 120, in the latter half of the compression stroke. The latter half of the compression stroke may also be referred to as a latter stage of the compression stroke.

A description is given next of operation of the engine start abnormality diagnosis apparatus according to the example embodiment.

Figure 4:
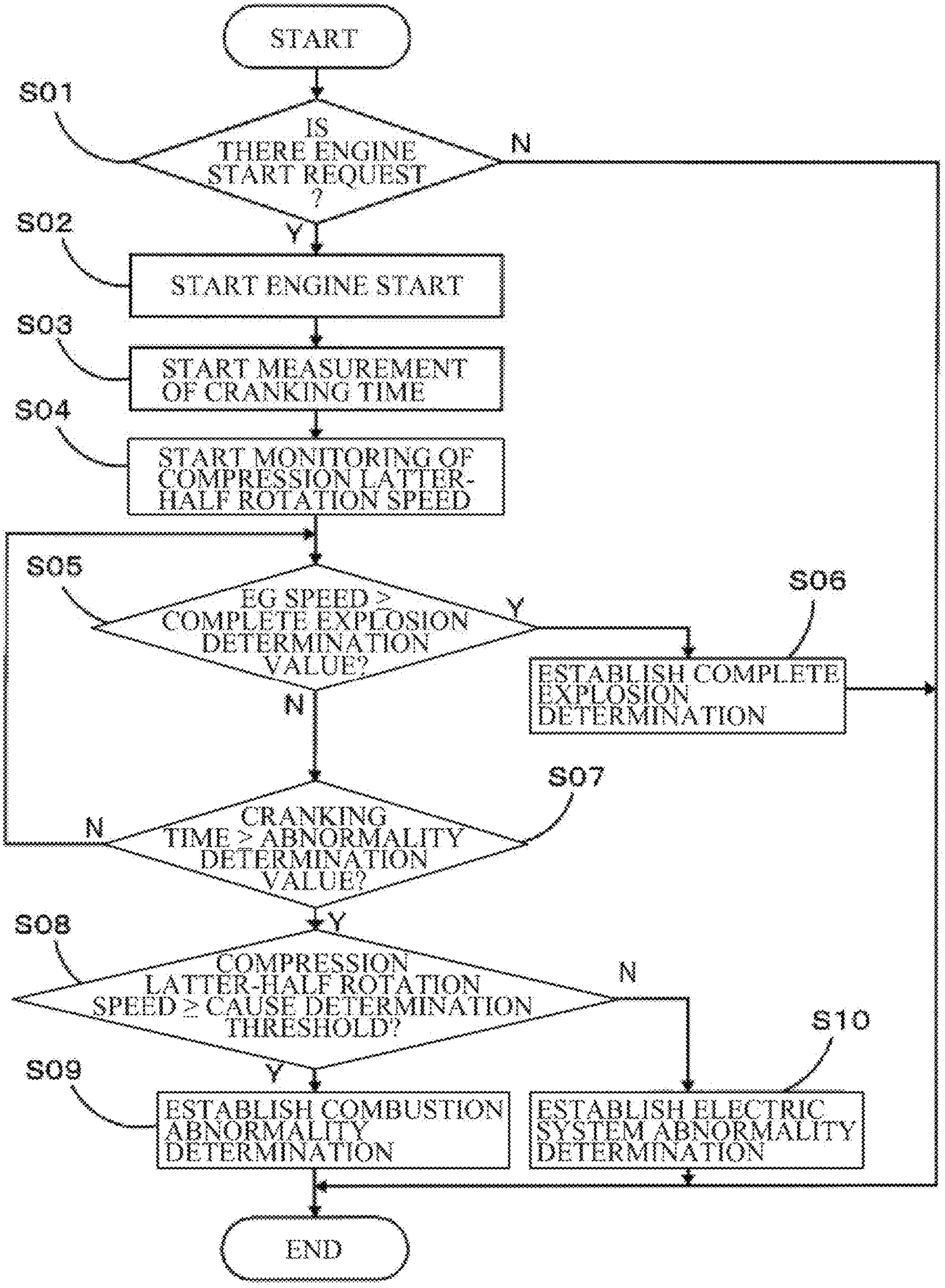
FIG. 4 is a flowchart illustrating operation performed when the engine is started by the engine start abnormality diagnosis apparatus according to one example embodiment.

FIG. 4 is a flowchart illustrating operation performed when the engine is started by the engine start abnormality diagnosis apparatus according to the example embodiment.

In the following, description is given in the order of steps.

[Step S01: Determining Presence or Absence of Engine Start Request]

When the engine 1 is in a stopped state, the engine control unit 100 may determine presence or absence of an engine start request, such as an engine start operation by the driver via, for example, an unillustrated ignition switch, or an engine re-start request in idling stop control.

If there is an engine start request (step S01: Y), the flow may proceed to step S02, and otherwise (step S01: N), the series of processes may be ended.

[Step S02: Starting Engine Start]

The engine control unit 100 may start electric power supply to the starter motor 120 using the starter relay 110, to activate the starter motor 120.

Thus, the starter motor 120 starts cranking of rotating and driving the crankshaft 10.

In addition, the engine control unit 100 may open the throttle valve 45 to a predetermined starting open position, and cause the ignition plugs 32 to start ignition and the injectors 39 to start fuel injection.

Thereafter, the flow may proceed to step S03.

[Step S03: Starting Measurement of Cranking Time]

The engine control unit 100 may start measurement of an elapsed time after the driving of the starter motor 120 is started in step S02. The elapsed time may hereinafter be referred to as a cranking time. The measurement may be incrementing a timer value.

Thereafter, the flow may proceed to step S04.

[Step S04: Starting Monitoring of Compression Latter-Half Rotation Speed]

Based on the output of the crank angle sensor 11, the engine control unit 100 may calculate an average rotation speed of the crankshaft 10 when any one cylinder (e.g., the first cylinder) is in the latter half of the compression stroke. This average rotation speed of the crankshaft 10 may hereinafter be referred to as a compression latter-half rotation speed. The latter half of the compression stroke may be from 90-degree CA before the compression top dead center to the compression top dead center. The engine control unit 100 may thus start monitoring of the compression latter-half rotation speed.

Thereafter, the flow may proceed to step S05.

[Step S05: Comparing Engine Speed with Complete Explosion Determination Value]

The engine control unit 100 may compare the rotation speed of the crankshaft 10 calculated based on the output of the crank angle sensor 11 with a preset complete explosion determination value. The rotation speed of the crankshaft 10 may hereinafter be referred to as the engine speed.

The complete explosion determination value may be a threshold set in consideration of the engine speed to be reached when the start of the engine 1 is normally performed.

If the engine speed is equal to or greater than the complete explosion determination value (step S05: Y), the flow may proceed to step S06, and otherwise (step S05: N), the flow may proceed to step S07.

[Step S06: Establishing Complete Explosion Determination]

The engine control unit 100 may establish complete explosion determination, assuming that the start of the engine 1 has been normally completed.

In response to the establishment of the complete explosion determination, the starter motor 120 may be stopped.

Thereafter, the series of processes may be ended.

[Step S07: Comparing Cranking Time with Abnormality Determination Value]

The engine control unit 100 may compare the cranking time obtained by the measurement started in step S03 with a preset abnormality determination value.

The abnormality determination value may be set to be longer than the cranking time desired for normal engine start by a predetermined value or more. For example, the abnormality determination value may be set to three seconds or more.

If the cranking time is equal to or greater than the abnormality determination value (step S07: Y), the flow may proceed to step S08, assuming that the long cranking abnormality has occurred in which the engine 1 is not normally started even though long-time cranking is performed. Otherwise (step S07: N), the flow may return to step S05, and the processes from step S05 may be repeated.

[Step S08: Comparing Compression Latter-Half Rotation Speed with Cause Determination Threshold]

The engine control unit 100 may compare the compression latter-half rotation speed obtained by the monitoring started in step S04 with a preset cause determination threshold.

The cause determination threshold may be a threshold for determination of whether the cause of the long cranking abnormality is the combustion abnormality or is the electric system abnormality.

For example, the cause determination threshold may be set to be lower, by a predetermined amount, than the compression latter-half rotation speed of the crankshaft 10 before the start when the starter motor 120 is normally operating.

If the compression latter-half rotation speed is less than the cause determination threshold (step S08: Y), the flow may proceed to step S10. If the compression latter-half rotation speed is equal to or greater than the cause determination threshold (step S08: N), the flow may proceed to step S09.

[Step S09: Establishing Combustion Abnormality Determination]

The engine control unit 100 may determine that the cause of the long cranking abnormality is the combustion abnormality, for example, an abnormality such as an air-fuel mixture generation failure, an ignition failure, or a misfire. The engine control unit 100 may thus establish combustion abnormality determination.

Thereafter, the series of processes may be ended.

[Step S10: Establishing Electric System Abnormality Determination]

The engine control unit 100 may determine that the cause of the long cranking abnormality is the electric system abnormality, for example, a malfunction of the body of the starter motor 120 or the power source, a circuit, etc. that supplies electric power to the starter motor 120. The engine control unit 100 may thus establish electric system abnormality determination.

Thereafter, the series of processes may be ended.

Figure 5:
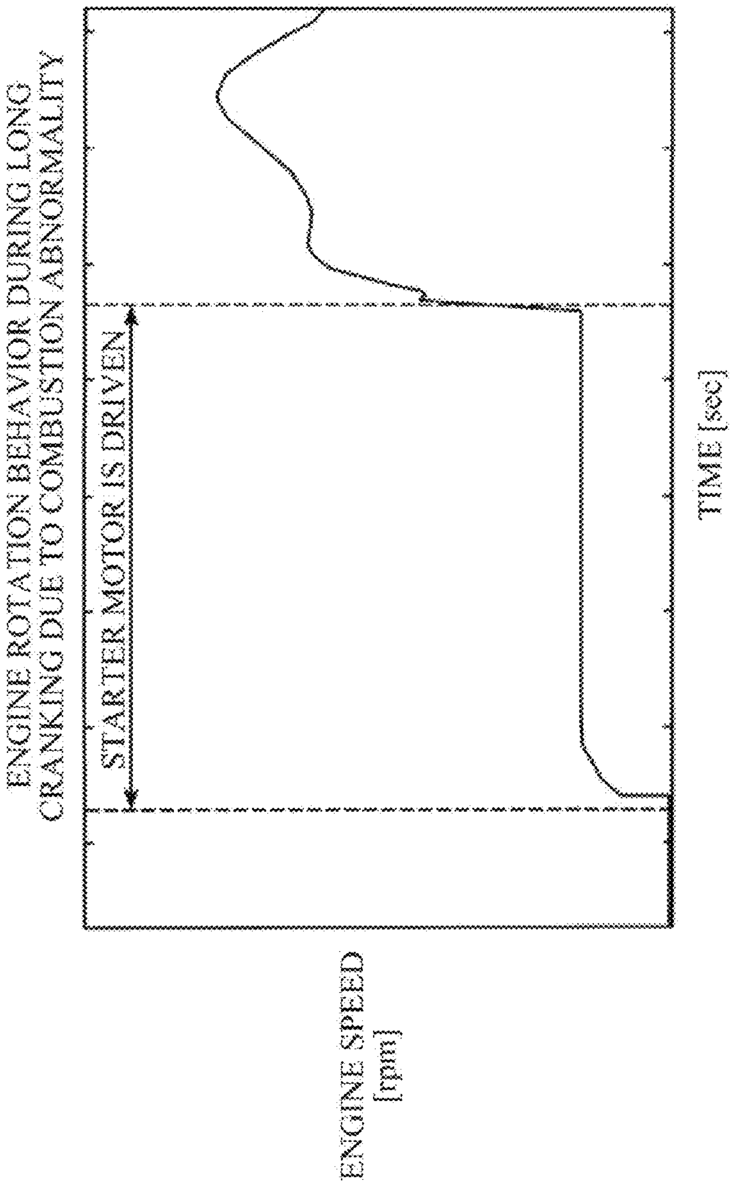
FIG. 5 is a diagram illustrating an example of transition of an engine speed in case of a long cranking abnormality due to a combustion abnormality.

FIG. 5 is a diagram illustrating an example of transition of the engine speed in a case of the long cranking abnormality due to the combustion abnormality.

The horizontal axis represents time, and the vertical axis represents the engine speed. The same applies to FIG. 6.

The example illustrated in FIG. 5 indicates that the engine speed is stable at, for example, about 300 rpm as a result of operation of the starter motor 120, but the combustion state enough for an increase to the engine speed desired for the start is not obtained thereafter, resulting in occurrence of the long cranking abnormality.

Figure 6:
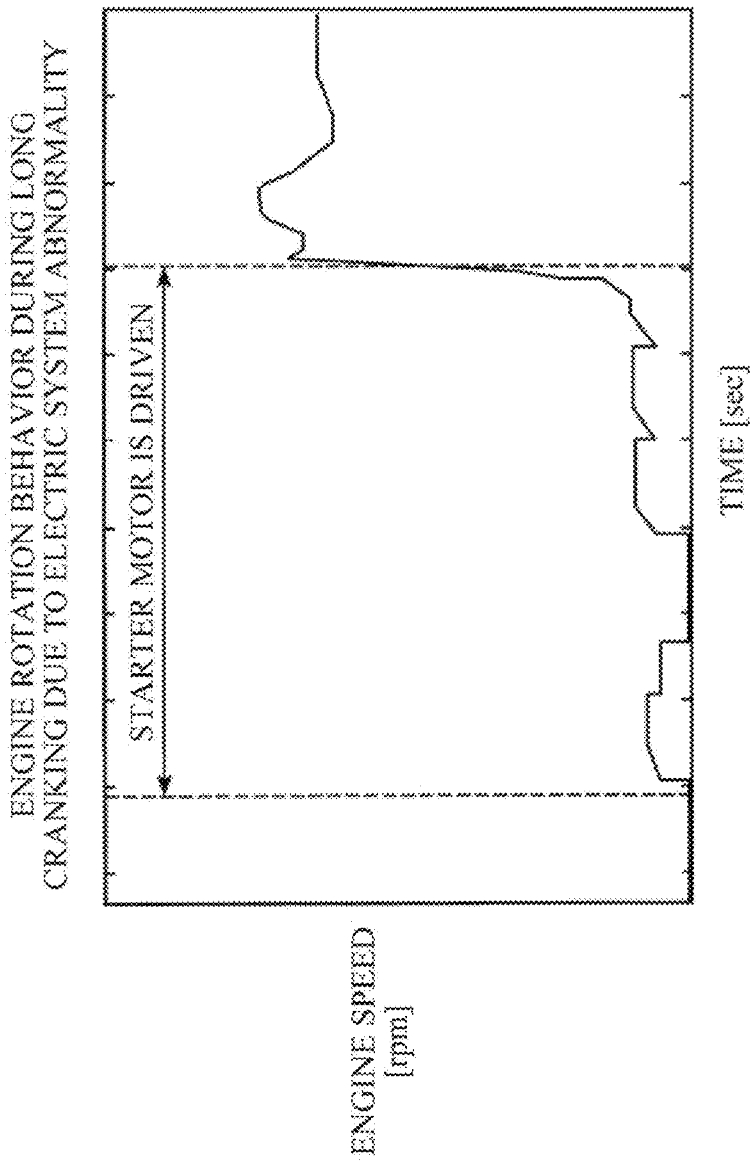
FIG. 6 is a diagram illustrating an example of transition of the engine speed in case of a long cranking abnormality due to an electric system abnormality.

FIG. 6 is a diagram illustrating an example of transition of the engine speed in a case of the long cranking abnormality due to the electric system abnormality.

In the example illustrated in FIG. 6, an intermittent engine rotation behavior is exhibited in which an increase and a stall of the engine speed are periodically repeated, due to insufficient torque of the starter motor 120.

In addition, the engine speed itself upon occurrence of this long cranking abnormality is low (e.g., 150 rpm or less) as compared with the case of the combustion abnormality.

Because the intermittent engine rotation behavior is exhibited in the case of the electric system abnormality, even if a typical engine speed, which is an instantaneous value, is compared with a predetermined threshold, it is difficult to distinguish between the combustion abnormality and the electric system abnormality.

Even if an average of the engine speeds is calculated and compared with a threshold, it is difficult to distinguish between a state of constantly rotating as in the case of the combustion abnormality and a state of intermittently rotating due to the electric system abnormality.

In contrast, in the example embodiment, the rotation speed of the crankshaft 10 in the latter half of the compression stroke, which is an engine rotation state suitable for narrowing down of causes, is extracted, and this compression latter-half rotation speed is compared with the threshold. This makes it possible to appropriately determine whether the cause of the long cranking abnormality is the combustion abnormality or is the electric system abnormality.

According to the example embodiments described above, it is possible to achieve effects described below.

(1) The rotation speed of the crankshaft 10 when at least one of the cylinders is in the latter stage of the compression stroke is compared with the cause determination threshold. This makes it possible to easily and quickly determine whether the cause of the long cranking abnormality is the combustion abnormality or is the electric system abnormality.

(2) The engine 1 may be a horizontally opposed four-cylinder engine that performs regular-interval ignition. In such a case, it is easier to extract the rotation speed of the crankshaft, i.e., the compression latter-half rotation speed, in a region where a starter motor driving load during cranking becomes heavy due to an action of, for example, an in-cylinder pressure of each cylinder or a valve spring reaction force of a valve driving system. This makes it possible to appropriately achieve the effect described above.

(3) The cause determination threshold may be set lower than the compression latter-half rotation speed during cranking performed when the starter motor 120 is normal. In such a case, the compression latter-half rotation speed exceeds the cause determination threshold when the cranking by the starter motor 120 is normal, which makes it possible to accurately distinguish between the electric system abnormality and the combustion abnormality.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the engine start abnormality diagnosis apparatus and the engine are not limited to those in the example embodiments described above, and may be changed as appropriate.

Specific modes of the components included in the engine start abnormality diagnosis apparatus and the engine may be changed as appropriate.

For example, operation implemented by a common unit in the example embodiments may be divided into, for example, multiple units.

In addition, the sensors are not particularly limited in configuration or arrangement.

(2) In the example embodiments, the engine may be, for example, a horizontally opposed four-cylinder direct injection gasoline engine that performs regular-interval ignition. However, for example, a fuel injection system and presence or absence of a supercharger are not particularly limited, may be changed as appropriate.

The disclosure is also applicable to, for example, an engine using a fuel other than gasoline, without being not limited to a gasoline engine. The disclosure is also applicable to an engine having another combustion cycle, such as an Otto cycle engine, an Atkinson cycle engine, or a diesel cycle engine.

(3) The cylinder layout and the number of cylinders in the example embodiments are examples, and may be changed as appropriate without being limited thereto.

For example, the engine may be a multi-cylinder engine that performs regular-interval ignition for each crank angle of 180 degrees or 360 degrees (e.g., a horizontally opposed four-cylinder engine, an in-line four-cylinder engine, an in-line two-cylinder engine, or a horizontally opposed two-cylinder engine). This makes it possible to achieve effects similar to those of the example embodiments.

(4) In the example embodiments, for example, the rotation speed of the crankshaft 10 from 90-degree CA before the compression top dead center to the compression top dead center may be extracted as the latter stage of the compression stroke. Alternatively, the latter stage of the compression stroke may be defined as a range including an extracted portion of the range of the angular positions or crank angles of the crankshaft during the compression stroke, the extracted crank angles having a median at a position later than 90 degrees before the compression top dead center.

The engine control unit 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control unit 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine control unit 100 illustrated in FIG. 1.

The invention claimed is:

1. An engine start abnormality diagnosis apparatus configured to determine a cause of a long cranking abnormality in which, when an engine comprising cylinders is started, start of the engine is not completed even if a cranking period is equal to or greater than a predetermined time, the engine start abnormality diagnosis apparatus comprising:

a rotation speed detector configured to detect a rotation speed of a crankshaft of the engine when at least one of the cylinders is in a latter stage of a compression stroke; and an abnormality diagnosis processor configured to determine that the cause of the long cranking abnormality is an electric system abnormality when the rotation speed detected by the rotation speed detector is less than a predetermined threshold, and determine that the cause of the long cranking abnormality is a combustion abnormality when the rotation speed is equal to or greater than the threshold.

2. The engine start abnormality diagnosis apparatus according to claim 1, wherein the engine comprises a four-cylinder or two-cylinder engine configured to perform regular-interval ignition.

3. The engine start abnormality diagnosis apparatus according to claim 1, wherein the threshold is set lower than the rotation speed of the crankshaft when at least one of the cylinders is in the latter stage of the compression stroke during cranking performed when a starter motor configured to drive the crankshaft is normal.

4. An engine start abnormality diagnosis apparatus configured to determine a cause of a long cranking abnormality in which, when an engine comprising cylinders is started, start of the engine is not completed even if a cranking period is equal to or greater than a predetermined time, the engine start abnormality diagnosis apparatus comprising:

a rotation speed detector configured to detect a rotation speed of a crankshaft of the engine when at least one of the cylinders is in a latter stage of a compression stroke; and an abnormality diagnosis processor configured to determine that the cause of the long cranking abnormality is an electric system abnormality when the rotation speed detected by the rotation speed detector is less than a threshold, and determine that the cause of the long cranking abnormality is a combustion abnormality when the rotation speed is equal to or greater than the threshold, wherein the threshold is set lower than the rotation speed of the crankshaft when at least one of the cylinders is in the latter stage of the compression stroke during cranking performed when a starter motor configured to drive the crankshaft is normal.

* * * * *